United States Patent
McCracken et al.

(10) Patent No.: US 7,258,145 B2
(45) Date of Patent: Aug. 21, 2007

(54) FUEL FILLER NECK ASSEMBLY AND METHOD OF FABRICATING

(75) Inventors: Douglas D. McCracken, Clarkston, MI (US); Thomas Barber, Rodney, MI (US); Jamie R. Pritchard, Evart, MI (US)

(73) Assignee: Dayco Products, LLC, Miamisburg, OH (US)

( * ) Notice: Subject to any disclaimer, the term of this patent is extended or adjusted under 35 U.S.C. 154(b) by 96 days.

(21) Appl. No.: 10/858,948

(22) Filed: May 28, 2004

(65) Prior Publication Data

US 2005/0263211 A1    Dec. 1, 2005

(51) Int. Cl.
*B65B 1/04*    (2006.01)
(52) U.S. Cl. ............... 141/304; 141/297; 141/301; 141/348; 220/86.2; 220/DIG. 33
(58) Field of Classification Search ........... 141/59, 141/285, 286, 297, 301, 304, 348–350; 220/86.2, 220/DIG. 33
See application file for complete search history.

(56) References Cited

U.S. PATENT DOCUMENTS

| | | | |
|---|---|---|---|
| 4,635,813 A | 1/1987 | Pieckert | |
| 5,033,517 A | 7/1991 | Bucci | |
| 5,056,570 A | 10/1991 | Harris et al. | |
| 5,395,004 A * | 3/1995 | Griffin et al. | 220/295 |
| 5,415,316 A | 5/1995 | Pemberton et al. | |
| 5,752,725 A | 5/1998 | El-Sovky | |
| 5,947,153 A | 9/1999 | Bucci et al. | |
| 6,019,348 A | 2/2000 | Powell | |
| 6,260,578 B1 | 7/2001 | Kuehnemund et al. | |
| 6,547,089 B2 * | 4/2003 | Pozgainer et al. | 220/304 |
| 6,591,871 B2 | 7/2003 | Smith et al. | |
| 6,755,316 B2 * | 6/2004 | Ono et al. | 220/304 |
| 2002/0059954 A1 | 5/2002 | Aoki et al. | |

* cited by examiner

*Primary Examiner*—Timothy L. Maust
(74) *Attorney, Agent, or Firm*—Joseph V. Tassone; Wiggin and Dana

(57) ABSTRACT

A fuel filler neck assembly having a uniform hemmed connection between an outer funnel portion and an inner funnel portion. The outer funnel portion is typically defined by an offset-expanded cylinder and sidewalls of varying thickness. The inner funnel portion includes sidewalls that have an internal thread, which is configured to mate with the threads of a gas cap. A hemmed connection is used to join one end of the outer funnel portion to one end of the inner funnel portion. The sidewalls at one end of the outer funnel portion are folded or bent inwardly and around the rim portion to define a curled portion. A tooling assembly for producing a uniform hemmed connection between one end of the outer funnel portion and one end of the inner funnel portion. A method of producing a uniform hemmed connection between portions of a fuel filler neck.

3 Claims, 4 Drawing Sheets

FUEL FILLER NECK ASSEMBLY AND METHOD OF FABRICATING

BACKGROUND OF THE INVENTION (1) Field of the Invention

The present invention generally relates to fuel fill systems in motor vehicles. In particular, the present invention is directed to a fuel filler neck assembly having a uniform hemmed connection between an outer funnel portion and an inner funnel portion, and a tooling assembly for and method of fabricating the uniform hemmed connection.

(2) Description of the Related Art

Fuel fill systems are found in motor vehicles such as automobiles, trucks, boats, airplanes, and the like, and serve to transfer fuel provided by a source external to the vehicle (e.g., a gas pump) to a fuel storage tank located in the vehicle. In general, fuel fill systems include a funnel assembly, called a fuel filler neck, connected to the fuel storage tank by one or more lengths of tube. The fuel filer neck receives fuel delivered from the external fuel source, and the one or more lengths of tube deliver the fuel to the fuel storage tank. A removable cap (e.g., a gas cap) is secured to the fuel filler neck to seal the fuel fill system after the fueling process.

In a typical fuel fill system, the fuel filler neck includes an outer funnel portion and an inner funnel portion. The outer funnel is generally connected to the fuel storage tank by tubing. The inner funnel typically includes threads that mate with a threaded gas cap and is sized to receive the nozzle from the external fuel source. The inner funnel is generally designed to fit snugly within the outer funnel but is usually not fastened or welded thereto. Rather, a separate flange is often welded to the end of the outer funnel to both connect the outer funnel to the vehicle and contain the inner funnel.

In other existing fuel fill systems, an attempt has been made to simplify fabrication of the fuel filler neck assembly by using a hemmed connection, i.e., the large diameter end of the outer funnel is folded over the large diameter end of the inner funnel, to join the outer and inner funnels. However, because outer funnel sidewalls generally have varying thicknesses due to an offset-expanded fabrication, the hemmed connection between the outer and inner funnels is often uneven thereby causing the inner funnel threads to be misaligned. Misalignment of the inner funnel threads is problematic because the threaded gas cap usually will not mate with the inner funnel threads unless the inner funnel threads are aligned properly.

BRIEF SUMMARY OF THE INVENTION

One aspect of the present invention is a fuel filler neck assembly including an offset-expanded outer funnel portion having a large diameter end defining a first aperture, an opposite small diameter end defining a second aperture, and sidewalls between the ends. The sidewalls define a curled portion at the large diameter end and have a variable thickness. The fuel filler neck assembly also includes an inner funnel portion having a large diameter end defining a first aperture, an opposite small diameter end defining a second aperture, and sidewalls between the ends. The sidewalls include an inwardly-raised surface that defines a thread and the sidewalls are folded outwardly at the large diameter end to define a rim portion. The inner funnel portion is positioned within the outer funnel portion. The fuel filler neck assembly also includes a hemmed connection between the large diameter end of the outer funnel portion and the large diameter end of the inner funnel portion. The large diameter end of the outer funnel portion is folded inwardly over the large rim portion thereby pinching the rim portion within the curled portion. The hemmed connection is uniform in that the curled portion has a consistent height and width.

Another aspect of the present invention is a tooling assembly for producing a uniform hemmed connection between an outer funnel end having variable wall thicknesses and an inner funnel end. The tooling assembly includes a jaw assembly having a top surface and a recessed portion. The recessed portion includes a sidewall surface and a shoulder surface arranged around an opening. The jaw assembly is adapted to hold the outer and inner funnel ends within the opening. The tooling assembly also includes a first tool having a bottom surface. The bottom surface includes a first portion sized to mate with the top surface of the jaw assembly and an indented second portion having a recessed surface and a sidewall surface. The second portion is sized to mate with the recessed portion of the jaw assembly and the sidewall surface of the indented second portion is sized to mate with the sidewall surface of the jaw assembly. The tooling assembly also includes a second tool having a bottom surface. The bottom surface includes a first portion sized to mate with the top surface of the jaw assembly, an elevated surface extending from the first portion, and fillet corners between the first portion and the elevated surface.

Still another aspect of the present invention is a method of producing a uniform hemmed connection between portions of a fuel filler neck. The method includes the following steps: providing an expanded end of an outer funnel, the end having an outside diameter and including substantially longitudinally-straight sidewalls and a lateral-shoulder portion both having variable sidewall thicknesses; providing an end of an inner funnel, the end of an inner funnel including outwardly folded sidewalls defining a rim portion; folding the substantially longitudinally-straight sidewalls of the outer funnel inwardly over the rim portion at substantially a right angle thereby sandwiching the rim portion between the sidewalls of the outer funnel; bending the substantially straight sidewalls of the outer funnel downwardly over the rim portion; and maintaining the outside diameter of the end of the outer funnel during the folding and bending steps.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
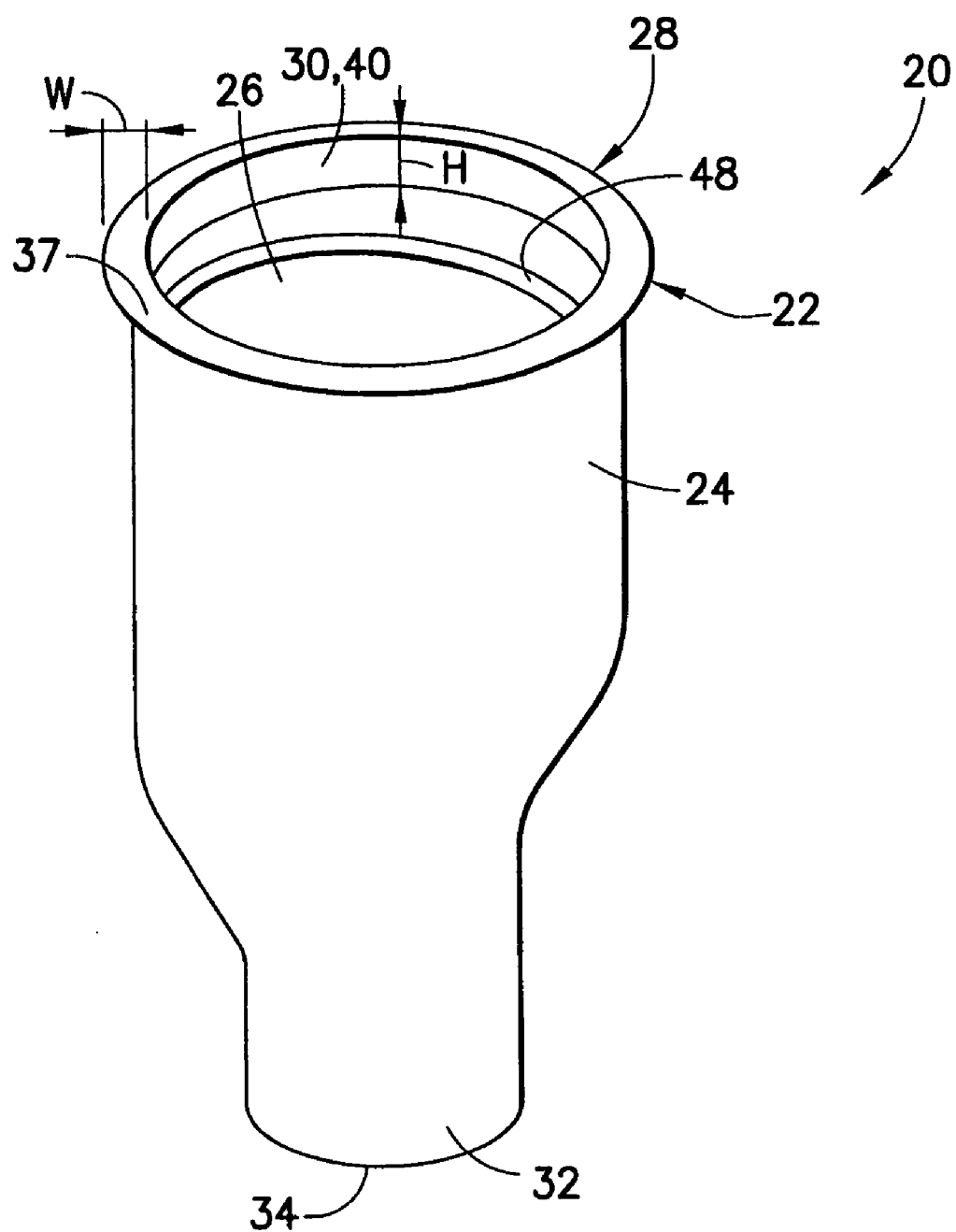
FIG. 1 is a front isometric view of a fuel filler neck according to one embodiment of the present invention.
Figure 2:
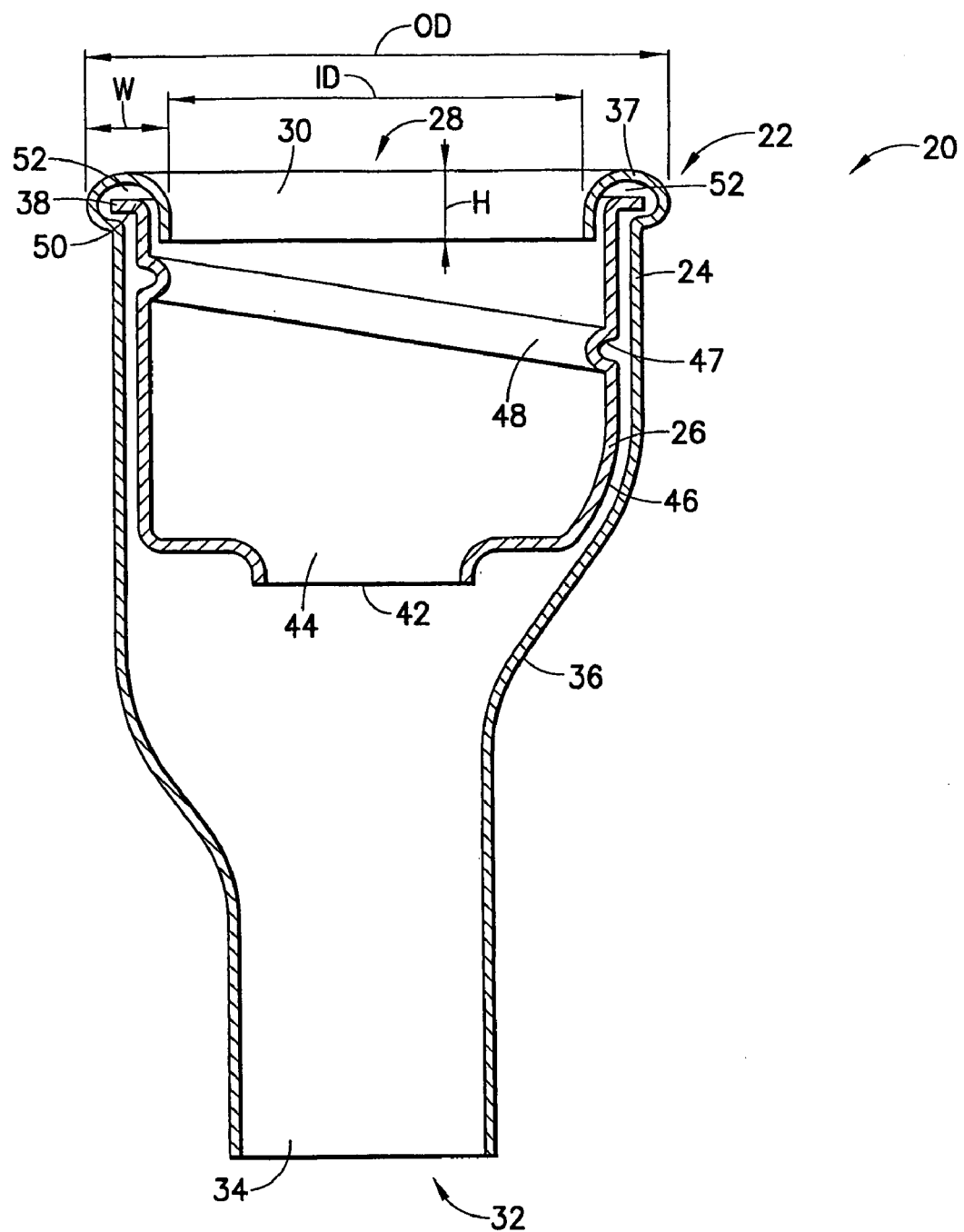
FIG. 2 is a cross-sectional view of a fuel filler neck according to one embodiment of the present invention.

Referring now to the drawings in which like reference numerals indicate like parts, and in particular to FIGS. 1 and 2, one aspect of the present invention is a fuel filler neck assembly 20 having a uniform hemmed connection 22 between an outer funnel portion 24 and an inner funnel portion 26.

Outer funnel portion 24 is typically defined by an offset-expanded cylinder, which includes an expanded large-diameter end 28 defining a first aperture 30, an opposite small diameter end 32 defining a second aperture 34, and sidewalls 36 between the ends. Large diameter end 28 typically has an expanded diameter with respect to the remaining portions of outer funnel portion 24. In addition, as part of fuel filler neck assembly 20, sidewalls 36 are folded inwardly at large diameter end 28 to define a curled portion 37. Curled portion 37 typically has a consistent height H and width W around its circumference and defines both an inside diameter ID and an outside diameter OD of large diameter end 28. Because they are offset-expanded, sidewalls 36 generally vary in thickness. Outer funnel portion 24 is typically formed from a thermoplastic material, but may also be made from any material that is consistent with its use and the fabrication processes disclosed herein. As one skilled in the art will appreciate, outer funnel portion 24 is similar to other outer funnel portions known in the art.

In one embodiment, inner funnel portion 26 has a large diameter end 38 defining a first aperture 40, an opposite small diameter end 42 defining a second aperture 44, and sidewalls 46 between the ends. Sidewalls 46 may include an inwardly-raised surface 47 defining a thread 48 having a spiral configuration (not shown) and a length (not shown). Thread 48 is typically configured to mate with the threads of a gas cap. At large diameter end 38, sidewalls 46 are generally folded or bent outwardly to define a rim portion 50. As described further below, inner funnel portion 26 is positioned within and joined to outer funnel portion 24. Inner funnel portion 26 is typically manufactured from the same materials as outer funnel portion 24, but may be manufactured from a different material. As one skilled in the art will also appreciate, inner funnel portion 26 is similar to other inner funnel portions known in the art.

Hemmed connection 22 is used to join large diameter end 28 of outer funnel portion 24 with large diameter end 38 of inner funnel portion 26. Sidewalls 36 of outer funnel portion 24 is folded or bent inwardly and around rim portion 50 to define curled portion 37. Curled portion 37 pinches rim portion 50 to form hemmed connection 22. Curled portion 37 defines a gap or space 52 between the curled portion and rim portion 50. Gap 52 is provided to compensate for the differences in material thickness along curled portion 37. As fabricated, hemmed connection 22 is uniform in that the curled portion 37 has a consistent width W and height H along its entire length or circumference. In one embodiment, H is at least 1 mm to ensure a satisfactory connection between outer and inner funnel portions 24 and 26. As a result, outer funnel portion 24, inner funnel portion 26, and thread 48 are held in axial alignment by hemmed connection 22.

Figure 3:
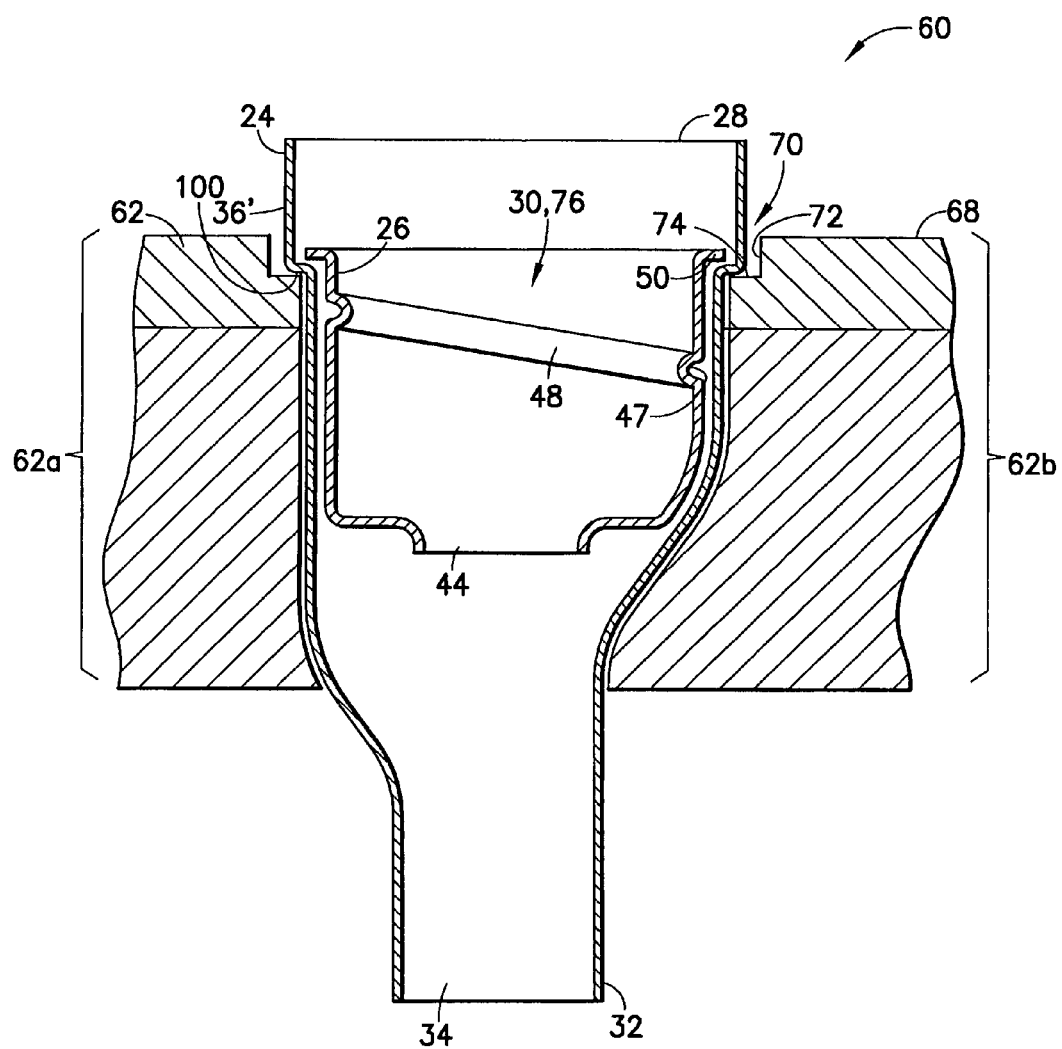
FIG. 3 is a cross-sectional view of a fuel filler neck during a fabrication process according to one embodiment of the present invention.
Figure 4:
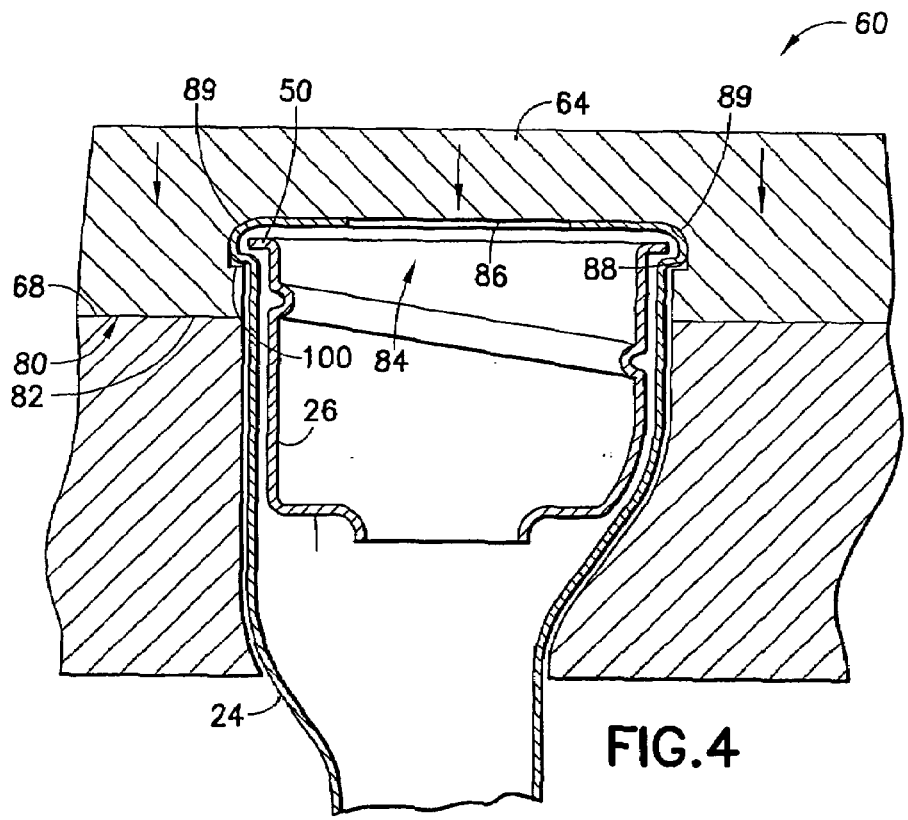
FIG. 4 is a cross-sectional view of a fuel filler neck during a fabrication process according to one embodiment of the present invention.
Figure 5:
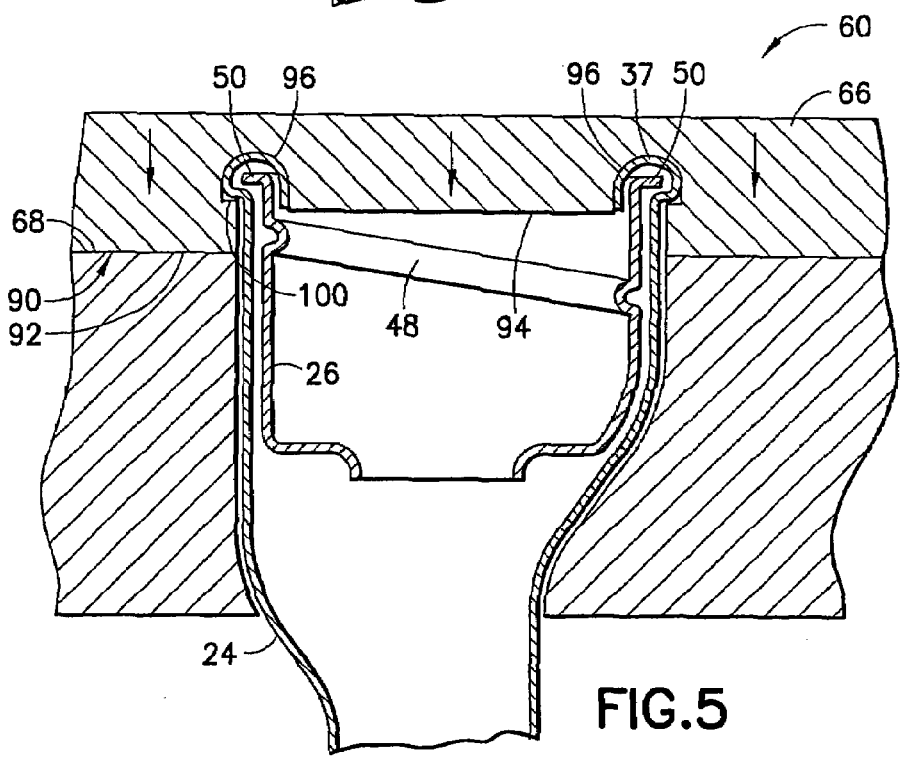
FIG. 5 is a cross-sectional view of a fuel filler neck during a fabrication process according to one embodiment of the present invention.

Referring now to FIGS. 3–5, another aspect of the invention is a tooling assembly 60 for producing uniform hemmed connection 22 between large diameter end 28 of outer funnel portion 24 and large diameter end 38 of inner funnel portion 26. Tooling assembly 60 generally includes a disc-shaped jaw assembly 62 for holding outer and inner funnel portions 24 and 26 during fabrication, a first tool 64 for beginning the formation of hemmed connection 22, and a second tool 66 for finishing the hemmed connection.

As illustrated in FIG. 3, disc-shaped jaw assembly 62 includes a top surface 68 and a recessed portion 70. Recessed portion 70 is typically an annular recess, which includes a sidewall surface 72 and a shoulder surface 74 arranged around an opening 76. Top surface 68 may be flat or include one or more raised surfaces (not shown). Jaw assembly 62 is sized to hold outer and inner funnel portions 24 and 26 within opening 76 during formation of hemmed connection 22. In one embodiment, jaw assembly 62 is divided into halves 62a and 62b, which may be adjustably closed to conform around and hold a particular fuel filler neck assembly during fabrication. Jaw assembly 62 is typically formed from a metal material, i.e., steel or similar, but may also be made using a hard thermoplastic material or similar.

Referring now to FIG. 4, first tool 64 includes a bottom surface 80 having a first portion 82 sized to mate with top surface 68 of jaw assembly 62. Bottom surface 80 also includes an indented second portion 84 having a recessed surface 86 and a sidewall surface 88. Recessed surface 86 and sidewall surface 88 are typically joined by a rounded or fillet corner 89. In one embodiment, fillet corner 89 has a minimum radius of 0.125". Second portion 84 is typically sized to mate with recessed portion 70 of jaw assembly 62 and sidewall surface 88 is typically sized to mate with sidewall surface 72 of jaw assembly 62. As discussed further below, first tool 64 is generally configured so that when first portion 82 contacts top surface 68, large diameter end 28 of outer funnel end 24 is folded inwardly at substantially a right angle. First tool 64 is typically manufactured from the same or similar materials as jaw assembly 62.

Referring now to FIG. 5, second tool 66 includes a bottom surface 90 having a first portion 92 sized to mate with top surface 68 of jaw assembly 62, an elevated surface 94 extending from the first portion, and fillet corners 96 between the first portion and the elevated surface. Typically, the radius of fillet corners 96 and height of elevated surface 94 are selected so that curled portion 37 folds over and pinches rim portion 50 when first portion 92 comes into contact with top surface 68 thereby finishing hemmed connection 22. Fillet corners 96 maintain both the inside diameter ID and outside diameter OD of curled portion 37 at large diameter end 28 of outer funnel portion 24 during fabrication. Second tool 66 may be manufactured from the same or similar materials as first tool 64.

In one embodiment, first portion 82 and recessed surface 86 of first tool 64 and are first portion 92 and elevated surface 94 of second tool 66 are substantially flat. In addition, in one particular embodiment, sidewall surface 72 of jaw assembly 62 is at least 2.8 mm, shoulder surface 74 is at least 2 mm, and opening 76 has a diameter of at least 50.4 mm.

Referring again to FIGS. 3–5, another aspect of the invention is a method of producing a uniform hemmed connection between portions of a fuel filler neck. First, as illustrated in FIG. 3, outer funnel portion 24 having an expanded large-diameter end 28, which has unfolded, longitudinally-straight sidewalls 36', and a lateral shoulder portion 100, is placed in jaw assembly 62. As mentioned above with respect to sidewalls 36, sidewalls 36' also vary in thickness. Lateral shoulder portion 100 rests on shoulder surface 74. Next, inner funnel portion 26 is positioned within outer funnel portion 24 so that rim portion 50 rests on lateral shoulder portion 100. Then, jaw assembly 62 is tightened so that it fits snugly around outer funnel portion 24.

Next, as illustrated in FIG. 4, first tool 64 is moved in a downward direction (as indicated by arrows) until first portion 84 contacts top surface 68. As first tool 64 moves downwardly, recessed surface 86 causes sidewalls 36' to fold inwardly over rim portion 50 at substantially a right angle thereby sandwiching the rim portion between the sidewalls. At the same time, sidewall surface 72, sidewall surface 88, and fillet corners 89 maintain outside diameter OD of large diameter end 28 as sidewalls 36' are being folded.

Then, as illustrated in FIG. 5, second tool 66 is moved in a downward direction (as indicated by arrows) until first portion 92 contacts top surface 68. As second tool moves downwardly, fillet corners 96 cause sidewalls 36' to bend downwardly over rim portion 50 thereby defining curl portion 37 around the rim portion. Sidewall surface 72, sidewall surface 88, and fillet corners 96 maintain outside diameter OD and inside diameter ID of large diameter end 28 as sidewalls 36' are being folded by second tool 66.

The fuel filler neck assembly of the present invention provides a simple, mechanical connection between inner and outer funnel portions. In addition, the fuel filler neck assembly of the present invention includes a uniform hemmed connection between the inner and outer funnel portions thereby reducing the incidents of inner funnel portion thread misalignment and ensuring a better fit between the threaded gas cap and inner funnel portion thread.

The tooling assembly and method of producing a uniform hemmed connection of the present invention provides a simple way of producing a uniformed hemmed connection between an outer funnel portion and an inner funnel portion. The tooling assembly and method of producing a uniform hemmed connection of the present allow existing parts to be fabricated with a reduced rate of inner funnel portion thread misalignment.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A fuel filler neck assembly comprising:
   an offset-expanded outer funnel portion having a large diameter end defining a first aperture, an opposite small diameter end defining a second aperture, and sidewalls between said ends, said sidewalls defining a curled portion at said large diameter end and having a variable thickness;
   an inner funnel portion having a large diameter end defining a first aperture, an opposite small diameter end defining a second aperture, and sidewalls between said ends, said sidewalls including an inwardly-raised surface defining a thread, said sidewalls being folded outwardly at said large diameter end to define a rim portion, said inner funnel portion positioned within said outer funnel portion; and
   a hemmed connection between said large diameter end of said outer funnel portion and said large diameter end of said inner funnel portion, said large diameter end of said outer funnel portion being folded inwardly over said large rim portion thereby pinching said rim portion within said curled portion, wherein said hemmed connection is uniform in that said curled portion has a consistent height and width.

2. An assembly according to claim 1, wherein said outer funnel portion and said thread are held in axial alignment by said hemmed connection.

3. A method of producing a uniform hemmed connection between portions of a fuel filler neck, said method comprising the steps of:
   providing an expanded end of an outer funnel, said end having an outside diameter and including substantially longitudinally-straight sidewalls and a lateral-shoulder portion both having variable sidewall thicknesses;
   providing an end of an inner funnel, said end of an inner funnel including outwardly folded sidewalls defining a rim portion;
   folding said substantially longitudinally-straight sidewalls of said outer funnel inwardly over said rim portion at substantially a right angle thereby sandwiching said rim portion between said sidewalk of said outer funnel;
   bending said substantially straight sidewalls of said outer funnel downwardly over said rim portion; and
   maintaining said outside diameter of said end of said outer funnel during said folding and bending steps.

* * * * *